(No Model.)

T. RODECKER.
VEHICLE AXLE.

No. 495,433.  Patented Apr. 11, 1893.

Witnesses
Thos. L. Milstead
M. C. Massie

Inventor
Thomas Rodecker
By Wm. Hunter Myers
Attorney

UNITED STATES PATENT OFFICE.

THOMAS RODECKER, OF MENDON, OHIO.

VEHICLE-AXLE.

SPECIFICATION forming part of Letters Patent No. 495,433, dated April 11, 1893.

Application filed January 3, 1893. Serial No. 457,043. (No model.)

*To all whom it may concern:*

Be it known that I, THOMAS RODECKER, a citizen of the United States of America, residing at Mendon, in the county of Mercer and State of Ohio, have invented certain new and useful Improvements in Vehicle-Axles, of which the following is a specification, reference being had therein to the accompanying drawings.

My invention relates to an improvement in vehicle-axles; and it has for its object the production of an axle whose spindle can be readily removed and replaced without disturbing other portions of the vehicle, the connection being made in such a manner as to counteract all leverage on the spindles and without weakening the axle.

The invention will first be described in connection with the accompanying drawings, and then pointed out in the claims.

Figure 1:
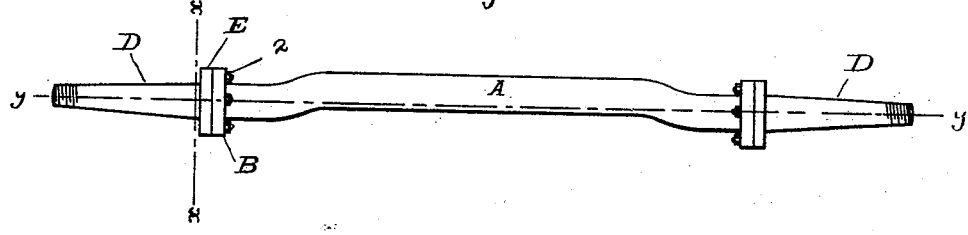
Figure 2:
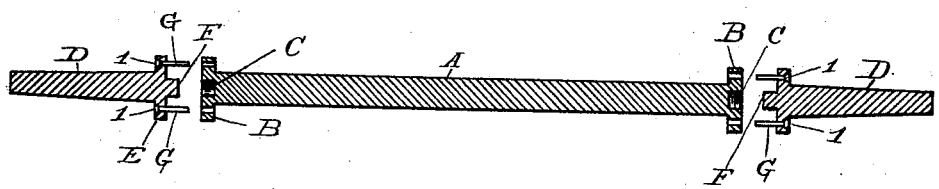
Figure 3:
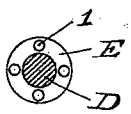

Figure 1 of the drawings is a side elevation of my improved axle. Fig. 2 is a longitudinal section of the axle, taken on the line $y\,y$, Fig. 1, with the spindles detached, showing the tenon and socket smooth at one end and screw-threaded at the other end. Fig. 3 is a transverse sectional view taken on the line $x\,x$, Fig. 1.

Referring to the drawings, A represents the axle, which is forged out of wrought iron or steel, heavy flanges B being formed on each end and provided with bolt-holes. In each end of the axle I form a socket C, which extends no farther inward than the thickness of the flange B.

D are the spindles, which are turned from any suitable metal, each having a flange E, of the same size as the flanges on the axle, and provided with bolt-holes. Inward from flange E there is formed a short tenon F, which is adapted to snugly fit in socket C in the axle. The spindles are secured to the axle by means of bolts G, which are headed on their outer ends, as at 1, and provided with screw-threaded nuts 2 on their inner ends, the bolt-holes in flanges E being countersunk on the outer side for the reception of the bolt-heads. The tenons F on the spindles and the sockets C in the axle may be smooth, as shown at one end of Fig. 2, or screw-threaded, as shown at the other end of that figure, my preference being to make them screw-threaded. By forming the sockets wholly within the flanged portions of the axle sufficient bearing is afforded the tenons to permit them to properly center the spindles, and yet the axle is not weakened, as would be the case were the sockets formed regardless of the flanges. Furthermore, by reason of the shallowness of the sockets but very short tenons are required, which entail in their production but little work on the lathe. As when the spindles are attached their flanges abut against the flanges on the axle, it will be aparent that undue leverage in any direction cannot be exerted on the spindles; it must of necessity be transmitted to the axle in practically the same manner as though the parts were formed integral.

Having thus described my invention, what I claim as new, and desire to secure by Letters Patent, is—

1. The combination, with an axle flanged at each end and having a longitudinal socket in each flanged portion, of a pair of spindles, each having a tenon adapted to fit snugly within its respective socket and a flange at the outer end of the tenon adapted to abut against the flange on the axle, and bolts passed through the flanges on the axle and spindles for securing the parts together, substantially as described.

2. The combination, with an axle flanged at each end and having a longitudinal socket wholly within each flanged portion, of a pair of spindles, each having a tenon adapted to fit snugly within its respective socket and a flange at the outer end of the tenon adapted to abut against the flange on the axle, and bolts passed through the flanges on the axle and spindles for securing the parts together, substantially as described.

3. The combination, with an axle flanged at each end and having a longitudinal screw-threaded socket wholly within each flanged portion, of a pair of spindles, each having a screw-threaded tenon adapted to fit within its respective socket and a flange adapted to abut against the flange on the axle, and bolts for securing the parts together, substantially as described.

In testimony whereof I affix my signature in presence of two witnesses.

THOMAS RODECKER.

Witnesses:
MINNIE BARBER,
M. A. BARLER.